United States Patent [19]

Crandall et al.

[11] Patent Number: 4,670,232
[45] Date of Patent: Jun. 2, 1987

[54] RECOVERY OF AMINES FROM BY-PRODUCT CHLORIDE SALTS

[75] Inventors: John W. Crandall; Donald C. Best, both of Charleston, W. Va.

[73] Assignee: Union Carbide Corporation, Danbury, Conn.

[21] Appl. No.: 458,821

[22] Filed: Jan. 18, 1983

Related U.S. Application Data

[60] Division of Ser. No. 328,188, Dec. 7, 1981, abandoned, which is a continuation of Ser. No. 188,062, Sep. 16, 1980, abandoned, which is a continuation of Ser. No. 788,947, Mar. 18, 1977, abandoned.

[51] Int. Cl.⁴ .................. C01D 3/08; C07C 85/04; C07C 85/16
[52] U.S. Cl. .................. 423/206 R; 210/694; 210/903; 423/499; 564/497; 564/498
[58] Field of Search .................. 423/206 R, 499; 564/497, 498; 210/694, 903

[56] References Cited

U.S. PATENT DOCUMENTS

| | | | |
|---|---|---|---|
| 2,281,879 | 5/1942 | Wayne | 564/59 |
| 3,151,163 | 9/1964 | Nussbaum | 564/482 |
| 3,202,713 | 8/1965 | Marullo et al. | 564/498 |
| 3,337,630 | 8/1967 | Moke et al. | 564/482 |
| 3,394,186 | 7/1968 | Muhlbauer | 564/498 |
| 3,410,906 | 11/1968 | Simpson et al. | 564/497 |
| 3,448,152 | 6/1969 | Milligan et al. | 564/498 |
| 3,763,239 | 10/1973 | Smolin | 564/498 |
| 3,862,234 | 1/1975 | Steele | 564/498 |
| 3,882,181 | 5/1975 | Forster et al. | 564/498 |
| 3,923,894 | 12/1975 | Andrewsen | 423/499 |
| 3,927,102 | 12/1975 | Chiou et al. | 564/494 |
| 4,053,516 | 10/1977 | Hammerstrom et al. | 564/498 |

OTHER PUBLICATIONS

Chemical Abstract, vol. 73, No. 80949m (1970).

Primary Examiner—John Doll
Assistant Examiner—Jeffrey Edwin Russel
Attorney, Agent, or Firm—Gerald L. Coon

[57] ABSTRACT

A method is disclosed for separating alkyleneamines from a mixture of by-product alkali or alkaline earth metal chloride salt and alkyleneamines comprising the sequenced combination of the steps of: (a) washing said amine-chloride salt mixture with an aqueous alkali or alkaline earth metal hydroxide solution to form a washed amine-chloride salt mixture; and (b) treating a mixture of the amino and chloride salt to physically separate chloride salt from said amine of said mixture.

4 Claims, 5 Drawing Figures

RECOVERY OF AMINES FROM BY-PRODUCT CHLORIDE SALTS

This application is a division of our prior U.S. application: Ser. No. 328,188 filing date Dec. 7, 1981 which is a continuation of application Ser. No. 188,062 filing date Sept. 16, 1980, which is a continuation of Ser. No. 788,947 filing date Mar. 18, 1977, all now abandoned.

This invention provides a novel process for the recovery of amines from the by-product metal chloride salts that are obtained from the commercial production of amines. The essential steps of the process comprise the washing of the salt with aqueous alkali or alkaline earth metal hydroxide, separating solid washed salt from the resulting mixture to provide a solution containing said amines.

BACKGROUND OF THE INVENTION

Amines are commercially produced on a broad scale by various processes. For example, an amine, such as ethylenediamine, may be commercially produced by the reaction of ethylene dichloride and an excess of anhydrous ammonia vapors under pressure at a temperature of 150° C. Anhydrous needles of ethylenediamine hydrochloride and other higher diamines are obtained. This product is treated with caustic soda to yield the free amine which is recovered from the diamine vapors, steam and unreacted ammonia by a dehydrating column where the diamine is dried and condensed.

In another procedure, ethylene dichloride is treated with excess aqueous ammonia in a pressurized reaction chamber at 110° C. and 10–200 atmospheres of pressure. The mixture of reaction products containing ethylenediamine hydrochloride, ammonium chloride and ammonia in aqueous solution is heated with aqueous caustic soda and fractionated. The ethylenediamine is drawn off and the ammonia released from the ammonium chloride is returned to the reactor.

Both of the above-described processes result in metal chloride as a reaction by-product. The chloride is obtained in impure form with a mixture of alkylene-amines as the principal contaminants. The mixture of amines includes low-molecular weight amines (ethylenediamine mol. wt. 60) to high-molecular weight amines (piperazines, polyamines etc. mol. wt. >200). This indicates that the heavier amines may be trapped within the crystal lattice of the metal chloride crystals and could not be removed by water while the low-molecular weight amines that have a greater affinity for water would migrate into water as they would tend to be on the outside surfaces of the metal chloride crystals.

It is desirable to recover the amines from the metal chloride by-product as the recovery of these products will improve the overall productivity of the process. In addition, it is also desirable to avoid contaminating natural waterways with amines when by-product metal chloride from amine synthesis reactions is discharged.

It has now been found that a properly sequenced combination washing and treatment process will separate the amines from salt so that the separated amines will be economically recoverable and the effluent will have a sufficiently decreased amine content that will not adversely affect the environment. The disclosed process has been found to be up to 98% effective in separating amines from metal chloride.

Accordingly, it is a principal object of this invention to provide an improved process for the separation of amines from the amine-containing soluble metal chloride by-product of an amine synthesis reaction.

It is also an object of this invention to provide a novel process of separating amines from the metal chloride by-product of an amine synthesis in such an efficient manner that the amines may be economically recovered.

It is also an object of this invention to provide a novel process for separating amines from the metal chloride by-product of an amine synthesis so that the amine content of the metal chloride by-product will be sufficiently reduced so that the environment will not be adversely affected by disposal into natural waterways.

DETAILED DESCRIPTION OF THE INVENTION

Figure 1:
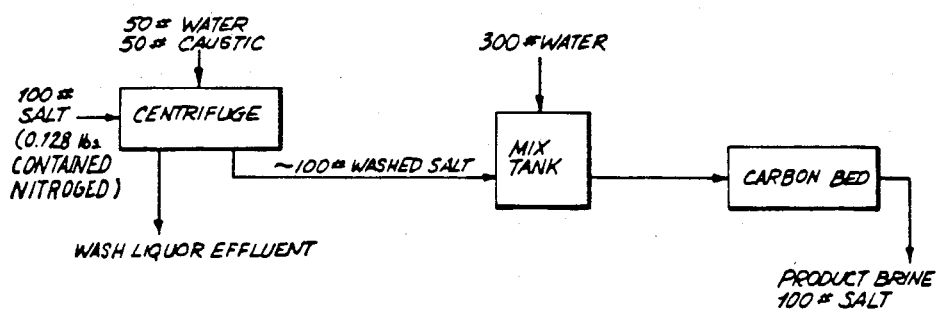
FIG. 1 is a flow sheet of an arrangement of apparatus for the practice of the invention.

In accordance with the present invention, a method is provided for separating alkyleneamines from a mixture of by-product soluble alkali or alkaline earth metal chloride salt and alkylene amines comprising the sequenced combination of the steps of: (a) washing said amine-chloride salt mixture with an aqueous alkali or alkaline earth metal hydroxide solution to form a washed amine-chloride salt mixture; and (b) treating a mixture of the amine-chloride salt mixture to physically separate amine from said chloride salt of said mixture.

It has been found that the steps (a) and (b) of the present invention, as set forth above, may be carried out sequentially in combination with other steps in a number of combinations. However, as will be shown by way of example and in the drawings hereinbelow, the washing and treating steps must be performed so that the washing, treating and dissolving steps are performed in that order.

The amine-chloride salt mixture, which is the primary concern of the present invention, is typically the amine-chloride salt by-product obtained by the caustic soda neutralization of the reaction product of ethylene dichloride and ammonia.

It has been found that commercial ethyleneamine process streams have an approximate composition as follows:

| Component | Wt. % | M.W. |
| --- | --- | --- |
| Ethylenediamine | 40–60 | 60 |
| Diethylenetriamine + aminoethyl piperazine | | up to |
| Triethylenetetramine | 60–40 | about |
| Tetraethylenepentamine | | 350 |
| Pentaethylenehexamine and heavier | | |

For the case where sodium chloride is the metal chloride, the sodium chloride washing operation can be conducted using water or aqueous alkali in a solution of up to 50% w/w of caustic soda. A preferred concentration of caustic soda is from 10–50% w/w. If water is used as solvent, the weight ratio of solvent-to-salt used is limited from about 0.1:1 to 1:1.5 (at 3:1, all of the salt dissolves). If aqueous caustic solutions are employed, the solvent-to-salt ratio can be increased, i.e. to about 0.1:1 to greater than 2:1 depending upon the caustic concentration in the solvent. In some instances it may be advantageous to employ aqueous caustic to neutralize any amine hydrochloride salts that may have been carried over into the sodium chloride cake. It has been found that there is no advantage in having a caustic soda concentration over 50% w/w.

The temperature of the salt-wash step is not especially critical but should be at such a level as to not cause excessive dissolution of the metal chloride. The particular solvent employed and the solubility of the metal chloride in it at any particular temperature would define the operating temperature of the metal chloride washing step. The wash liquor effluent from the washing step is returned to the process at the point at which caustic is added to neutralize the amine-hydrochloride salts.

The pressure of the metal chloride washing step should be controlled so that all liquids present remain in the liquid phase. This pressure would be defined by the operating temprature of the system and the particular solvent used.

The treating step is carried out to physically separate the metal salt from the mixture. This may be performed in any of the many forms of physical separation apparatus known to the art, such as centrifuges, rotary separators and the like.

The separated salt can be dissolved in water and treated with an adsorbent to remove additional amines.

The operation of the activated carbon bed is not pressure dependent except that the pressure be sufficient to maintain the feed as liquid. It is preferred to operate the activated carbon bed at temperatures below 100° C. and preferbly below 50° C. for most effective removal of amines from the aqueous brine feed. A preferred temperature range is between 10° and 50° C.

In the case of sodium chloride as the metal chloride, the aqueous brine feed should have a concentration of 10–28% w/w of sodium chloride, with a preferred concentration being about 20–28% w/w. All references herein to solution concentrations are on a weight/weight basis unless otherwise indicated.

The activated carbon may be charcoal that is produced by destructive distillation of vegetable matter such as wood, rice hulls, nut shells, etc. It may be regenerated for use in the present process by treatment with hot water to remove the adsorbed amines. The water should be sufficiently heated to remove the adsorbed amines. Usually a temperature in the range of 60°–100° C. will be adequate for this purpose. If desired, the carbon may be regenerated at higher temperatures using less water. For example, temperatures of 150°–300° C. and pressures of about 70–400 psig may be used. The amines can be recovered from the essentially salt-free hot water carbon regeneration stream by ion-exchange techniques.

The amines salts of acids are not adsorbed by the carbon bed and thus the amines can be washed out of the bed with hot water or with a dilute solution of 1–25% mineral acid such as hydrochloric, sulfuric, nitric and the like. Aqueous alkali may be employed in a second washing step to insure complete neutralization of any residues from the mineral acid washing step. The particular aqueous alkali is not critical and from 0.1–25% aqueous solutions of alkali metal or alkaline earth metal hydroxides, carbonates, bicarbonates, etc., alone or in admixture may be employed for this purpose. Sodium hydroxide is the preferred alkali. Optionally, an intermediate water-washing step may be employed.

The preferred regeneration technique comprises the use of aqueous hydrochloric acid to recover the amines of the hydrochloride form for recycle to the amine synthesis process. The preferred regeneration process may be carried out by continuously recycling an aqueous solution of hydrochloric acid (1–15%) through the carbon bed, while adding any necessary makeup acid until the amine concentration builds up to a desired level. At that point, a slip-stream of concentrated amine hydrochlorides may be removed and sent to the neutralization step where the ethylene dichloride-ammonia reaction product is neutralized and the metal salt is formed.

FIG. 1 is a flowsheet that illustrates one mode for the practice of the invention. Other variations of this basic arrangement may be employed using suitable types of apparatus. This arrangement is based upon treating 100 pounds of salt. The final salt (recovered as a 25% brine solution) contains about 24 ppm organic nitrogen on a water-free basis. Thus, the process removes about 98% of the amines from the starting salt.

Figure 2:
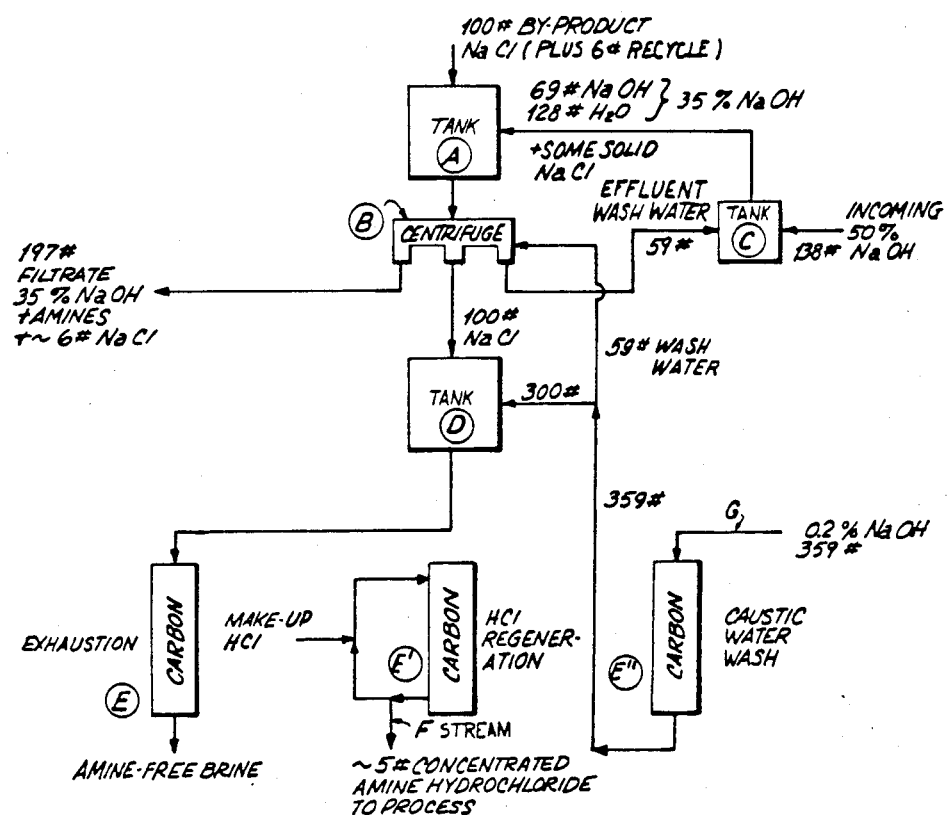
FIG. 2 is a flow sheet of a preferred arrangement of apparatus for the practice of the invention which includes means for the regeneration of the carbon bed.

FIG. 2 is a flowsheet that describes another mode for the practice of the invention. By-product salt from the ethylene-amine-synthesis is mixed with 35% sodium hydroxide in Tank A. The mixture is then fed to centrifuge B wherein the 35% sodium hydroxide and some of the lower molecular weight amines are removed as the filtrate and sent to the ethyleneamine synthesis process to be used in the neutralization of the ethylene dichloride-ammonia reaction product.

The salt cake in the centrifuge is washed with water to remove excess sodium hydroxide and the wash effluent is used to dilute the concentrate (50%) solution of sodium hydroxide in Tank C. Most of the sodium chloride that dissolves in the wash water will precipitate in the presence of the aqueous sodium hydroxide in Tank C. The washed sodium chloride cake from centrifuge B is dissolved in water in Tank D to provide an aqueous solution of about 25 wt. % sodium chloride. The 25 wt. % sodium chloride solution is passed through carbon bed E to remove amines. Effluent brine from E is essentially free of amines.

Carbon bed E is regenerated as shown in E' by passing aqueous hydrochloric acid (3–5%) through the bed to recover amines as amine hydrochlorides. The aqueous hydrochloric acid is reused until the amine hydrochloride concentration builds up to about 3% and then a slip-stream F of concentrated amine hydrochlorides is removed and sent to the crude product neutralization step, where the aminehydrochlorides are neutralized and salt is formed. Makeup hydrochloric acid is added as needed. The regeneration of the crabon bed is completed as shown in E" by a wash through line G with a sufficient amount of dilute sodium hydroxide (i.e. <1–10%) to neutralize any amine hydrochloride and residual hydrochloric acid and yield a pH of at least 7 in the effluent, preferably a pH of from 10–12. A portion of the effluent from this caustic washing step may be fed to Tank D and a portion may be used as the water wash in centrifuge B. To allow for continuous operation of the process, it is desirable to provide three carbon beds and the appropriate connections that will permit one carbon bed to be used in the separation of amines, while a second carbon bed is subjected to the acid regeneration treatment and a third is subjected to the neutralizing regeneration treatment. The only added water that is recycled to the process is passed through stream F. The additional heat load imposed by this variation of the process is about 50 BTU-per-pound of processed salt. After passing through the carbon bed, the sodium chloride may be recrystallized and the sodium chloride free water effluent may be further treated by ion exchange techniques to remove trace amounts of amines or the salt-free effluent could be subjected to a conventional biological treatment to further reduce nitrogenous components.

Figure 3:
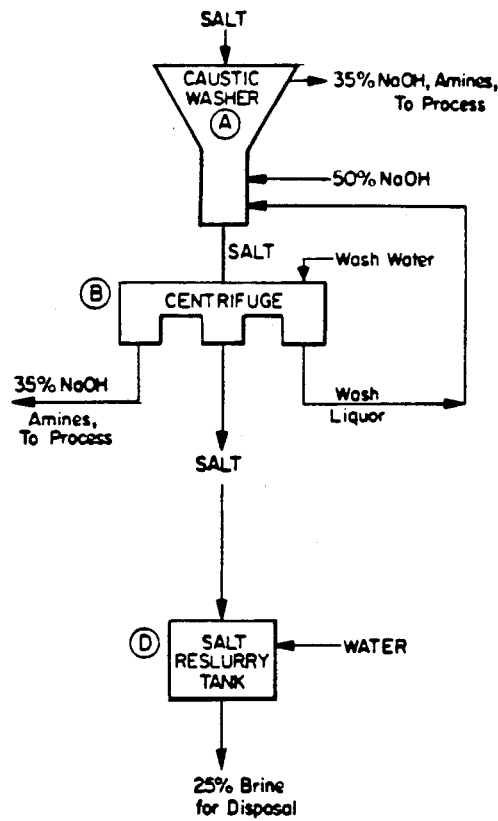
FIG. 3 is a flow sheet of a modified arrangement of apparatus for the practice of the invention.

FIG. 3 is a flowsheet that illustrates a further mode for the practice of the invention. In this mode, caustic and water washing are carried out concurrently in Tank A. The washed salt is then physically treated for separation in the Centrifuge B to provide: salt, a recycle stream to the amine process and a wash liquor stream for recycling to the caustic and water washing step. The salt is then reslurried with water in Tank D for disposal of the brine.

Figure 4:
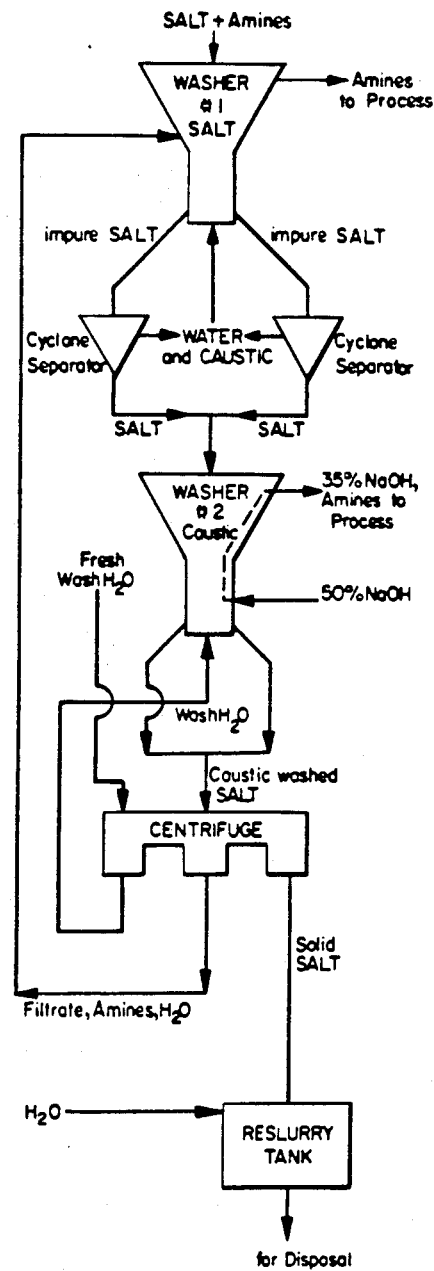
FIG. 4 is a flow sheet of a further modified arrangement of apparatus for the practice of the invention.

FIG. 4 is a flowsheet that illustrates a still further mode for the practice of the invention. In this mode, the salt and amines are first washed in tank #1 in the recycled filtrate and fresh water to form salt and recycled water which are separated in a pair of cyclone separators. The salt is then again washed with caustic and recycled wash water in tank #2 to produce a caustic-washed salt. This salt is then washed with fresh water while centrifuging to provide: solid salt, a filtrate which is recycled to the first washing step and water which is recycled to the second washing step. The solid salt is then reslurried with water for disposal.

DESCRIPTION OF THE PREFERRED EMBODIMENTS

EXAMPLE 1

To determine the feasibility and effectiveness of the process of the invention the following experiments were carried out:

Sodium chloride from a commercial ethyleneamine synthesis process containing about 1600 ppm amine was used to prepare an aqueous 25 weight percent salt solution. The solution was contacted with powdered Atlas DARCO activated carbon (S51 grade) at 25° C. On a water-free basis, the treated sodium chloride contained about 370 ppm amine. The experiment was repeated at 40° C. On a water-free basis, the recovered sodium chloride contained about 840 ppm amine.

The sodium chloride crystals (about 1600 ppm amine) were washed first with methanol and then with water. The washed sodium chloride contained about 225 ppm amine. This washed sodium chloride was then dissolved in water to prepare a 25 weight percent salt solution. A portion of the solution was contacted with powdered Atlas DARCO activated carbon (S51 grade) at 25° C. On a water-free basis, the recovered sodium chloride contained about 40 ppm amine. The carbon treatment was repeated at 50° C. and on a water-free basis the sodium chloride contained about 80 ppm amine.

These experiments show that the type of amines removed by washing the sodium chloride are not easily removed by carbon and that carbon treatment is more effective at low temperature.

EXAMPLE 2

This example illustrates that activated carbon preferentially adsorbs high-molecular weight amines from sodium chloride solutions.

An aqueous solution of 25 weight percent sodium chloride containing 0.05 weight percent ethylenediamine (molecular weight=60.1) was contacted with powdered Atlas DARCO activated carbon (S51 grade) at 25° C. The mixture was filtered, and the filtrate contained 0.02 weight percent ethylenediamine. Thus, 60 percent of the ethylenediamine was adsorbed by the carbon.

An aqueous solution of 25 weight percent sodium chloride containing 0.075 weight percent tetraethylenepentamine (TEPA, molecular weight=189.3) was contacted with powdered Atlas DARCO activated carbon (S51 grade) at 25° C. The mixture was filtered and the filtrate contained 0.01 weight percent TEPA. Thus, 87 percent of the TEPA was adsorbed by the carbon.

EXAMPLE 3

An amine-containing sodium chloride cake from a commercial ethylenediamine synthesis was mixed with an equal weight of water, stirred, and then filtered in a Buchner funnel to form a washed amine sodium chloride mixture. Results are tabulated below.

| Sample | Sample wt. gms | Nitrogen, ppm | Nitrogen wt, gms |
|---|---|---|---|
| Original Salt | 1000 | 1280 | 1.280 |
| Filtrate | 1343 | 657 | 0.882 |
| Washed salt | 657 (by difference) | 284 | 0.187 |

Thus, the washing step removed 78% of the amines.

Washed sodium chloride (284 ppm nitrogen) was dissolved in distilled water to make a 25 wt. % sodium chloride solution containing 71 ppm nitrogen. This solution was pumped through a 1-inch diameter column packed to a height of 10 inches with 58 gms of Westvaco Nuchar WVG 12×40 mesh activated carbon. The feed rate was about 9 gms/minute. Effluent samples were periodically removed and analyzed. Results were as follows:

| Effluent Sample | Sample wt. gms | Nitrogen, ppm |
|---|---|---|
| 1 | 212 | Not analyzed |
| 2 | 260 | 5 |
| 3 | 236 | Not analyzed |
| 4 | 289 | 11 |
| 5 | 236 | Not analyzed |
| 6 | 266 | 11 |
| 7 | 304 | Not analyzed |
| 8 | 260 | Not analyzed |
| 9 | 153 | 19 |
| Total fed 2216 gms (0.16 gms Nitrogen) | | |

The nitrogen content of the total composite effluent was estimated to be about 12 ppm. The carbon treatment thus removed 83% of the amines remaining after the salt wash step.

The starting material contained 1280 ppm nitrogen and after the salt wash and carbon treatment the recovered salt would contain about 50 ppm nitrogen (on a water-free basis). Therefore, the overall nitrogen reduction from the two steps was $$\frac{(1280 - 50)(100)}{1280} = 96\%$$

The activated carbon bed was regenerated by passing hot water through the column.

The bed was inverted so that water flow was countercurrent to the exhaustion step. Hot water (about 95° C.) was pumped through the bed at a rate of about 10 ml/minute. This was considered to be too fast a rate so a second hot water wash was done at a rate of about 3.3 ml/minute. In both washes, 240 gms of water were used. Effluents from the first and second washes contained 87 and 69 ppm nitrogen, respectively.

A third wash was done with 240 ml of 0.1N sodium hydroxide at 25° C. to see if additional amines could be recovered in case amine hydrochlorides were present. Effluent from this wash (including column draining) contained only 12 ppm nitrogen. The nitrogen recovery balance was poor. Based upon the analyses of the regeneration effluents, 0.039 gm organic nitrogen was recovered. Since the carbon bed was estimated to contain 0.13 gm nitrogen, the nitrogen recovery was $$\frac{(0.039)(100)}{0.13} = 30.0\%.$$

In spite of this, nearly complete regeneration was apparently achieved because, in subsequent exhaustion cycles, the carbon bed exhibited essentially the same capacity for removing amines.

EXAMPLE 4

The possibility existed that due to incomplete neutralization, some amines could be present as amine hydrochlorides in the sample of sodium chloride cake from a commercial ethylenediamine synthesis plant that was employed in Example 3. Amines in the hydrochloride form would neither be preferentially removed by washing the sodium chloride nor by carbon treatment because they would behave as salt. Also, when water was used to wash the sodium chloride, either additional recrystallization facilities or recycle of the wash liquor effluent would be required to recover the dissolved sodium chloride and amines. Either choice would impose additional heat loads to the commercial system, because the water used in the walt wash must eventually be vaporized.

To eliminate both the possibility of amine hydrochlorides and the vaporization of wash water, the use of aqueous 50% sodium hydroxide in the initial salt wash was tested. The wash liquor effluent from the sodium chloride wash step would consist of amines, sodium hydroxide, water, and very little sodium chloride, and could be used to neutralize reactor products in a commercial facility.

The sodium chloride cake was mixed with an equal weight of aqueous 50% sodium hydroxide, stirred, and filtered in a Buchner funnel. Results are tabulated below.

| Sample | Sample wt., gms | Nitrogen ppm | Nitrogen wt., gms |
|---|---|---|---|
| Original salt | 1000 | 1280 | 1.280 |
| Filtrate | 1040 | 321 | 0.334 |
| Washed salt | 960 (by difference) | 565 | 0.542 |

This washing step removed 56% of the amines compared to 78% when an equal weight of pure water was used. With the caustic wash, the sodium chloride-to-water ratio was 0.5 rather that 1.0 in the pure water wash (Example 3). Therefore, the amine reduction was lower because less water was used in the caustic wash test compared to the pure water wash.

Washed sodium chloride (565 ppm nitrogen) was dissolved in ion-exchange water to make a 25% brine solution containing 141 ppm organic nitrogen. The regenerated carbon bed from Example 3 was used to treat the solution which was pumped through the bed at a rate of about 5 gms/minute. Results were as follows:

| Effluent Sample | Sample wt., gms | Nitrogen, ppm |
|---|---|---|
| 1 | 312 | Not analyzed |
| 2 | 288 | Not analyzed |
| 3 | 288 | 3 |
| 4 | 300 | Not analyzed |
| 5 | 300 | 3 |
| 6 | 300 | Not analyzed |
| 7 | 288 | Not analyzed |
| 8 | 288 | 7 |
| 9 | 300 | Not analyzed |
| 10 | 264 | 13 |
| Total fed | 2928 gms (0.413 gm Nitrogen) | |

The composite effluent contained 0.67 wt % sodium hydroxide (determined by titration with 0.1N hydrochloric acid) and by calculation about 6 ppm organic nitrogen. Thus, the carbon treatment removed about 96% of the remaining amines.

On a water-free basis, the salt would contain about 25 ppm organic nitrogen. Therefore, the overall nitrogen removal from the combination caustic salt wash and carbon treatment was $$\frac{(1280 - 25) \times (100)}{1280} = 98\%$$

The fact that the regenerated carbon was effective in removing amines indicates that the previous regeneration of Example 3 was effective even though the amines material balance was poor (30% amine recovery). The regenerated carbon was able to process 732 gms contained salt. This is a salt-to-carbon weight ratio of 12.6 compared to 9.5 with "virgin" carbon. By material balance, about 0.4 gm organic nitrogen was adsorbed on the regenerated bed.

The fact that carbon treatment was much more effective in removing amines after caustic wash than after pure water wash indicates that amine hydrochlorides may have been present. The use of caustic, therefore, freed the amines so that they could be removed by adsorption.

The carbon bed column was inverted and 240 gms of hot water (about 90° C.) were pumped into the base at a rate of 0.8 gm/minute. Effluent samples were then analyzed for nitrogen.

| Effluent Sample | Sample (wt. in gms) | Nitrogen, ppm | Nitrogen (wt. in gms) |
| --- | --- | --- | --- |
| 1 | 70 | 335 | 0.025 |
| 2 | 35 | 267 | 0.009 |
| 3 | 50 | 214 | 0.011 |
| 4 | 60 | 192 | 0.012 |
| | | Total | 0.057 |

As in the case of the first regeneration (Example 3), the nitrogen recovery was poor. The estimated weight of nitrogen adsorbed on the bed was 0.4 gms based upon the results of carbon treatment of the brine. Only 0.057 gms nitrogen (or 14%) was apparently recovered.

The carbon regenerations were done at atmospheric pressure in the laboratory; therefore, the regeneration temperature was limited to the boiling point of water at atmospheric pressure.

EXAMPLE 5

The following work was carried out to illustrate the use of hydrochloric acid in the regeneration of the carbon bed that is employed in the separation of amines from a brine solution.

A "synthetic" feed was prepared that approximated the high-molecular weight amine-brine mixture that is obtained after washing the salt residue of an ethyleneamine synthesis. The "synthetic" feed contained 25 wt. % sodium chloride, 75 wt. % water and 0.2 wt. % amines. The amines had the following composition:

| | wt. % |
| --- | --- |
| triethylenetetramine | 48 |
| tetraethylenepentamine | 19 |
| polyamine D | 1 |
| polyamine H | 32 |

A 1-inch diameter glass column wrapped with heating tape was packed to a height of about 15 inches with 90 gms of Calgon Filtrasorb activated carbon (12–28 mesh). The feed point was at the base of the column and effluent was removed at the top. The free-space in the bed was about 90 ml. Each test consisted of four cycles: exhaustion, hydrochloric acid regeneration, water-wash and caustic wash. Because hydrochloric acid and caustic were present, the Dohrmann technique for reductive nitrogen was used to analyze samples for amines, instead of the N-point titration method. Operating conditions and results for the individual tests are summarized in Tables I and Table II The synthetic feed (containing about 1000 ppm nitrogen) was pumped into the base of the carbon bed at 25° C. at a rate of about 725 gms-per-hr. Titration of effluent with 0.1N HCl and N-point indicator was used as a rough guide to monitor effluent quality. This technique could be applied near the end of the cycle because most of the caustic had been washed off by then. When the effluent analyzed about 0.02 meq/gm amine, the exhaustion cycle was stopped and the column was drained. The pH of the effluent remained essentially constant (11±1) during the exhaustion cycle, so pH measurement could not be used to monitor amine breakthrough during the cycle. As shown in Table II, the bed was able to average treating 3886 gms of feed and achieve an 85.4% nitrogen reduction in the 25 tests. The average nitrogen loading on the carbon was 0.037 gm of nitrogen per gm of carbon.

The regeneration cycle was started using about 900 gms of an aqueous solution containing about 15% excess of the stoichiometric amount of hydrochloric acid. As the test work progressed, it was necessary to use a greater excess of hydrochloric acid. The results seemed to indicate that as the amine hydrochloride concentration was allowed to increase in the regeneration stream, a larger and larger excess of hydrochloric acid was required to increase the driving force to remove amines from the bed. This trend is shown in Table II. In the last few tests, the free hydrochloric acid in the regeneration stream was about 3%. This represents an excess of about 200% of the stoichiometric amount of acid required.

The regeneration cycle was conducted by filling the bed with hydrochloric acid solution; this required about 90 ml. The bed was then heated with electrical heating tapes to a temperature of about 67±2° C. and allowed to stand for one hour. The remaining regeneration solution of hydrochloric acid was then pumped into the base of the column at a rate of about 250 gms/hr. The pH of the effluent from the regeneration cycle started at about 11 and at the end was <1.0, indicating that free hydrochloric acid was present. The column was then drained and the drainings were added to the regenerate effluent. The regenerate stream was then sampled and analyzed. Makeup 37% aqueous hydrochloric acid was then added to again provide a 200% excess to prepared the regenerate for the next cycle. Thus, during the tests the regeneration cycle volume remained essentially constant at about 900 ml. The removal of material for analysis and the addition of makeup acid were roughly in balance, by volume. These operations would simulate purging a slip stream of the regenerate to the process and addition of makeup hydrochloric acid in a plant system.

Startup for the water-wash cycle was similar to the regeneration cycle. About 90 ml of water were used to fill the bed. The bed was then heated to 67±2° C. and allowed to stand for about one hour. Water was then pumped into the base of the column at a rate of about 250 gm/hr. A total of 300 gms wash water was used. The pH of the water-wash effluent remained acidic through the wash cycle, usually less than 1.0. The column was then drained and the drainings added to the effluent.

It should be noted in Table II that in the final tests, when the nitrogen concentration had been allowed to increase in the regeneration stream, more nitrogen was also present in the wash water.

Aqueous 0.5N NaOH was pumped into the base of the column at 25° C. at a rate of about 250 gms/hr. The pH of the effluent was used to control this cycle. The pH of the effluent samples started at about 1.0; when the effluent pH reached a value of about 11.0, the caustic addition was stopped and the column was drained. The system was then ready to start the exhaustion cycle of the next test.

As seen in Table II, the effluent from the caustic-wash cycles was quite low in nitrogen content compared to the water-wash effluents. This is explained by the fact that the caustic neutralized the remaining hydrochloric acid and the amine hydrochlorides and produced free amines. These free amines were then readsorbed on the bed since they were no longer in the hydrochloride form.

Inspection of the exhaustion cycles for Tests A through Y indicated that the bed was less effective in removing nitrogen during the later tests that it was in the earlier tests based upon the nitrogen content of the exhaustion cycle effluent.

To determine if the bed activity could be recovered, it was given a regeneration with fresh hydrochloric acid (no nitrogen present) followed by a water-and-caustic wash (see Test Z, Table III). After these treatments, a complete test cycle was conducted (Test A[1], Table III). As seen in Table III, the exhaustion cycle effluent from Test A[1] contained 117 ppm nitrogen. This value is comparable to those obtained during the early tests as shown in Table II and show that the bed's activity was recovered by treatment with "virgin" (amine-free) hydrochloric acid.

Nitrogen Balance (Table IV)

Data from Tests A through Y in Table II were used to calculate the weight of nitrogen contained in the individual streams for each test. These values are given in Table IV.

Nitrogen content in the hydrochloric acid-regeneration cycles were derived by two procedures in Table IV. The values given in column (a) were obtained by assuming that the analyses of the exhaustion, water-wash, and caustic-wash effluent were accurate and that the brine feed contained 1000 ppm nitrogen. The weight of nitrogen in the hydrochloric acid stream was then obtained by difference. Also, it was assumed that no purge stream was removed from the hydrochloric acid stream so that the weight of contained nitrogen progressively increased throughout the tests.

The experimental values for contained nitrogen in the hydrochloric acid stream are given in column (b). The Dohrmann method of analysis for reductive nitrogen is most accurate at low concentrations of nitrogen. Therefore, in all probability, the analyses of the hydrochloric acid stream were probably subject to the greatest error because the samples had to be greatly diluted to keep the Dohrmann recorder signal response on scale. It was, therefore, felt that in order to study this process it would be justified to assume that the nitrogen concentration would be additive for each test.

Therefore, column (a) in Table IV "synthesized" a hydrochloric acid regenerate stream through 25 cycles of operation with no purge. At the end of 25 cycles, the stream would contain 44.5 gms nitrogen.

The totals in Table IV show how the amines (expressed as nitrogen) were distributed through each cycle. These results can be expressed as follows:

| | |
|---|---|
| Amines fed to system in brine stream = | 100.0% |
| Amines in exhaustion effluent = | 14.8% |
| Amines in hydrochloric acid effluent = | 45.7% |
| Amines in water-wash effluent = | 34.4% |
| Amines in caustic-wash effluent = | 5.1% |
| | 100.0% |

These results show that the hydrochloric acid and water-wash streams must be returned to the process since they contain 80.1% of the amines.

TABLE I

| Operating Conditions for Tests | | |
|---|---|---|
| 1. | Exhaustion Cycle | |
| | (a) Temperature | 25° C. |
| | (b) Feed rate | 725 gms/hr |
| | (c) Effluent pH | |
| | At start of cycle | ~11.5 |
| | At end of cycle | ~11.0 |
| 2. | HCl - Regeneration Cycle | |
| | (a) Temperature | 65–70°C. |
| | (b) Feed rate | 250 gms/hr |
| | (c) Effluent pH | |
| | At start of cycle | ~10.5 |
| | At end of cycle | <1 |
| 3. | Water-Wash Cycle | |
| | (a) Temperature | 65–70° C. |
| | (b) Feed rate | 250 gms/hr |
| | (c) Effluent pH | <1 through all of cycle |
| 4. | Caustic-Wash Cycle | |
| | (a) Temperature | 25° C. |
| | (b) Feed rate | 250 gms/hr |
| | (c) Effluent pH | |
| | At start of cycle | ~1.5 |
| | At end of cycle | ~11.5 |

TABLE II

LABORATORY STUDIES ON USE OF ACTIVATED CARBON TO RECOVER AMINES FROM BY-PRODUCT SALT
Summary of Results on Tests A Through Y

| | Exhaustion Cycle (a,b) | | HCl - Regeneration Cycle | | Free Hcl (c) | |
|---|---|---|---|---|---|---|
| Test | Stream Weight, gms | Nitrogen, ppm in Effluent (b) | Stream Weight, gms | Nitrogen, ppm in Effluent | Inlet | Effluent |
| A | 4257 | 25 | 1000 | 3600 | 0.6 | (d) |
| B | 4164 | 36 | 942 | 5850 | 0.72 | (d) |
| C | 3410 | 39 | 909 | 7530 | 0.69 | (d) |
| D | 3642 | 100 | 934 | 5280 | 0.74 | (d) |
| E | 2958 | 101 | 809 | 4820 | 0.9 | (d) |
| F | 3573 | 83 | 813 | 5787 | 1.2 | (d) |
| G | 4680 | 118 | 896 | 6860 | 1.3 | (d) |
| H | 4304 | 78 | 837 | 7230 | 1.2 | (d) |
| I | 4037 | 300 | 850 | 6710 | 0.7 | (d) |
| J | 4408 | 145 | 821 | 6300 | 1.2 | (d) |
| K | 3677 | 146 | 872 | 8460 | 1.15 | (d) |
| L | 3932 | 111 | 927 | 8050 | 1.33 | 0.2 |
| M | 3341 | 121 | 927 | 9286 | 1.51 | 0.31 |
| N | 3666 | 137 | 905 | 9048 | 1.55 | 0.42 |
| O | 4338 | 162 | 921 | 9746 | 1.73 | 0.40 |
| P | 4478 | 158 | 955 | 9524 | 1.62 | 0.31 |
| Q | 3828 | 148 | 971 | 9160 | 1.58 | 0.31 |
| R | 3642 | 209 | 924 | 9795 | 1.3 | (d) |
| S | 3700 | 187 | 855 | 8561 | 2.18 | 0.61 |
| T | 3376 | 114 | 888 | 9716 | 2.66 | 1.04 |
| U | 3689 | 152 | 899 | 8589 | 2.92 | ND |
| V | 3677 | 154 | 907 | 9050 | 3.42 | 1.46 |

TABLE II-continued
LABORATORY STUDIES ON USE OF ACTIVATED CARBON TO RECOVER AMINES FROM BY-PRODUCT SALT
Summary of Results on Tests A Through Y

| | | | | | | |
|---|---|---|---|---|---|---|
| W | 3874 | 287 | 927 | 12,000 | 3.35 | 1.62 |
| X | 4524 | 347 | 918 | 15,777 | 3.24 | 1.48 |
| Y | 3967 | 183 | 961 | 10,660 | 3.24 | 1.68 |
| Total | 97142 | | ~1000 gms (e) | | | |
| Average per test | 3886 gms | 146 ppm | ~1000 gms | | | |

| | Water-Wash Cycle | | Caustic-Wash Cycle (0.5 N) | |
|---|---|---|---|---|
| Test | Stream Weight, gms | Nitrogem, ppm in Effluent (b) | Stream Weight, gms | Nitrogen, ppm in Effluent (b) |
| A | 300 | 1960 | 465 | 143 |
| B | 300 | 3840 | 435 | 400 |
| C | 300 | 6300 | 370 | 528 |
| D | 500 | 9260 | 390 | 976 |
| E | 300 | 6000 | 460 | 495 |
| F | 300 | 2580 | 455 | 233 |
| G | 300 | 4080 | 425 | 410 |
| H | 300 | 2930 | 400 | 432 |
| I | 300 | 3380 | 410 | 234 |
| J | 300 | 1090 | 646 | 92 |
| K | 300 | 2680 | 400 | 325 |
| L | 300 | 3020 | 405 | 276 |
| M | 300 | 3725 | 425 | 391 |
| N | 300 | 3706 | 425 | 398 |
| O | 300 | 4202 | 460 | 641 |
| P | 300 | 4092 | 475 | 459 |
| Q | 300 | 4780 | 475 | 407 |
| R | 300 | 4082 | 470 | 557 |
| S | 300 | 3367 | 455 | 372 |
| T | 300 | 3700 | 475 | 416 |
| U | 300 | 3484 | 460 | 351 |
| V | 500 | 3330 | 460 | 369 |
| W | 300 | 6278 | 480 | 559 |
| X | 300 | 5895 | 480 | 651 |
| Y | 300 | 5380 | 450 | 435 |
| Total | 7900 gms | | 11251 gms | |
| Average per test | 316 gms | 4126 ppm | 450 gms | 422 ppm |

Average nitrogen removal in exhaustion cycle: 85.4%
Average nitrogen loading on carbon: 0.037 gm nitrogen/gm carbon
Legend:
ND - not determined
HCl - hydrochloric acid
(a) Feed to exhaustion cycle contained about 1000 ppm nitrogen.
(b) Analyzed by the Dohrmann technique for reductive nitrogen.
(c) Determined by titration with 0.1 N NaOH with N-point indicator.
(d) Sample was basic when N-point indicator was added; therefore, free HCl could not be measured.
(e) The HCl was recycled for each test to allow amines to concentrate by adding makeup acid prior to each reuse. Removal of sample for analyses and varying the amount of makeup acid accounts for variation in the weight of the stream. It was assumed that the HCl Regeneration stream would be maintained at about 1000 gms in a continuous process if the system were in balance with respect to makeup acid and sample withdrawal.

TABLE III
ETHYLENEAMINES
Additional Tests to Determine if Carbon Bed Was Losing Activity

Test Z
1. Procedure
A fresh 900-gm solution of aqueous 5.9 wt. % HCl was prepared and pumped through the bed at 70° C. The bed was drained and the bed was given a water wash followed by caustic wash.

2. Results

| | HCl Regeneration | Water Wash | 0.5 N Caustic Wash |
|---|---|---|---|
| Weight of stream, gms | 879 | 300 | 450 |
| Nitrogen, ppm in effluent (a) | 335 | 429 | 49 |
| Temperature, °C. | 70 | 67 | 25 |

Test A[1]
1. Procedure
After conditioning bed in Test Z, the normal cycles were run. The HCl effluent from Test Z contained 3.92 wt. % free HCl and was used as the regenerate.

2. Results

| | Exhaustion | HCl Regeneration | Water Wash | Caustic Wash |
|---|---|---|---|---|
| Weight of stream, gms | 3944 | 891 | 300 | 415 |
| Nitrogen, ppm in effluent (a) | 117 | 2480 | 565 | 54 |
| Temperature, °C. | 25 | 70 | 71 | 25 |

88.3% amine reduction was achieved in the Exhaustion cycle.
(a) Analyzed by the Dohrmann technique for reductive nitrogen.

TABLE IV
Overall Nitrogen Balance From Tests A through Y Based Upon Data in Table II
Nitrogen weight, gms

| Test | Exhaustion Cycle | | HCl - Regeneration Cycle Effluent | | Water-Wash Cycle | Caustic-Wash Cycle |
|---|---|---|---|---|---|---|
| | Inlet | Effluent | (a) | (b) | Effluent | Effluent |
| A | 4.3 | 0.1 | 3.5 | 3.6 | 0.6 | <0.1 |
| B | 4.2 | 0.2 | 6.1 | 5.5 | 1.2 | 0.2 |
| C | 3.4 | 0.1 | 7.3 | 6.8 | 1.9 | 0.2 |

TABLE IV-continued

Overall Nitrogen Balance From
Tests A through Y Based Upon Data in Table II
Nitrogen weight, gms

| Test | Exhaustion Cycle Inlet | Exhaustion Cycle Effluent | HCl-Regeneration Cycle Effluent (a) | HCl-Regeneration Cycle Effluent (b) | Water-Wash Cycle Effluent | Caustic-Wash Cycle Effluent |
|------|------|------|------|------|------|------|
| D | 3.6 | 0.4 | 5.5 | 4.9 | 4.6 | 0.4 |
| E | 3.0 | 0.3 | 6.2 | 3.9 | 1.8 | 0.2 |
| F | 3.6 | 0.3 | 8.6 | 4.7 | 0.8 | 0.1 |
| G | 4.9 | 0.6 | 11.5 | 6.2 | 1.2 | 0.2 |
| H | 4.3 | 0.3 | 14.4 | 6.1 | 0.9 | 0.2 |
| I | 4.0 | 1.2 | 16.1 | 5.7 | 1.0 | 0.1 |
| J | 4.4 | 0.6 | 19.5 | 5.2 | 0.3 | 0.1 |
| K | 3.7 | 0.5 | 21.8 | 7.4 | 0.8 | 0.1 |
| L | 3.9 | 0.4 | 24.3 | 7.5 | 0.9 | 0.1 |
| M | 3.3 | 0.4 | 25.9 | 8.6 | 1.1 | 0.2 |
| N | 3.7 | 0.5 | 27.8 | 8.2 | 1.1 | 0.2 |
| O | 4.3 | 0.7 | 29.8 | 9.0 | 1.3 | 0.3 |
| P | 4.5 | 0.7 | 32.2 | 9.1 | 1.2 | 0.2 |
| Q | 3.8 | 0.6 | 33.8 | 8.9 | 1.4 | 0.2 |
| R | 3.6 | 0.8 | 35.1 | 9.1 | 1.2 | 0.3 |
| S | 3.7 | 0.7 | 36.9 | 7.3 | 1.0 | 0.2 |
| T | 3.4 | 0.4 | 38.6 | 8.6 | 1.1 | 0.2 |
| U | 3.7 | 0.6 | 40.4 | 7.7 | 1.1 | 0.2 |
| V | 3.7 | 0.6 | 41.6 | 8.2 | 1.7 | 0.2 |
| W | 3.9 | 1.1 | 42.2 | 11.1 | 1.9 | 0.3 |
| X | 4.5 | 1.6 | 43.0 | 14.5 | 1.8 | 0.3 |
| Y | 4.0 | 0.7 | 44.5 | 10.2 | 1.6 | 0.2 |
| Total | 97.4 | 14.4 | 44.5 | — | 33.5 | 5.0 |

(a) Values were calculated by difference, assuming that there was no recycle and amines were allowed to concentrate in the regeneration stream until Test Y.
(b) Actual values from Table II; these are subject to greater error because of the high dilutions required in the method of analysis used.

EXAMPLE 6

An exhausted, amine laden carbon bed was subjected to a hot water regeneration cycle at about 225° C. and 320 psig pressure. The results reported in Table V demonstrate the effectiveness of hot water method of regeneration. A disadvantage of this method is that large quantities of water are required and thus large amounts of heat are also required.

TABLE V

Hot Water Regeneration

I. Apparatus

1-inch diameter steel column packed to a height of about 10 inches with 60 gms of Westvaco Nuchar WVG activated carbon, 12 × 40 mesh.

II. General Procedure

(1) Exhaustion - The aqueous 25% brine feed containing 0.04 meq/gm total amines described in Example 5 was pumped into the base of the column at a rate of about 700 gms/hr at 25° C. and atmospheric pressure.
(2) Water wash - Water at 25° C. was pumped into top of column at a rate of about 600 gms/hr to remove excess salt.
(3) Regeneration - Column was operated at a pressure of about 300 PSIG; water at about 225° C. was pumped into top of column at a rate of about 100 gms/hr.
(4) Analyses - meq/gm amine values were determined by titration with 0.1 N HCl and N-point indicator; salt was determined by evaporation.

TABLE V-continued

Hot Water Regeneration

III. Results

| | Test 1 | Test 2 | Test 3 | Test 4 | Test 5 |
|---|---|---|---|---|---|
| Exhaustion Cycle | | | | | |
| Wt., gms | 3352 | 3457 | 3712 | 2912 | 3480 |
| Meq. amine fed | 131 | 138 | 148 | 116 | 139 |
| Meq. amine in effluent | 20 | 28 | 33 | 26 | 31 |
| Water-Wash Cycle | | | | | |
| Wt., gms | None | 500 | 500 | 500 | 500 |
| Meq. amine in effluent | — | 12 | 16 | 12 | 10 |
| Salt, wt % in effluent | — | 7 | 3 | 3 | 3 |
| Regeneration Cycle | | | | | |
| Wt., gms | 1720 | 1120 | 970 | 1160 | 1650 |
| Meq. amine in effluent | 156 | 90 | 87 | 77 | 83 |
| Salt, wt % in effluent | 2 | 0.3 | 0.4 | 0.2 | 0.2 |

IV. Amine Material Balance (based upon Tests 2-5), meq. of amine

| Input | | Output | | % of Input |
|---|---|---|---|---|
| Feed | 541 | Exhaustion | 118 | 21.8 |
| | | Water Wash | 50 | 9.2 |
| | | Regeneration | 337 | 62.3 |
| | | Total | 505 | 93.3 |

EXAMPLE 7

A caustic-wash-water-wash salt purification operation was conducted batchwise using a Buchner filter funnel to simulate centrifuge operation. Fourteen 1000 gram batches of impure by-product salt from a commercial ethyleneamines process were purified in accordance with the following steps:

1. To start the process, 1000 grams of impure salt was slurried with 1380 grams of an aqueous 50 percent (wt.) sodium hydroxide and 590 grams of distilled water;
2. The slurry was filtered through a Buchner funnel, and the filtrate was discarded in the first pass, but saved in subsequent passes;
3. The salt-cake in the buchner funnel was washed by pouring 590 mls of distilled water over the cake; the wash-water was collected in a filter flask and saved;
4. The washed salt was recovered from the Buchner funnel and discarded in the first pass, but saved in subsequent passes;
5. The wash-water from step 3 above was mixed with another 1380 gram batch of aqueous 50 wt% sodium hydroxide solution;
6. Another 1000 gram batch of impure salt was slurried with the aqueous sodium hydroxide prepared in step 5 above. This slurry was filtered as described in step 2; and
7. Steps 2 through 6 were repeated until a total of 30.8 lbs. of impure salt has been treated. A total of 65.1 lbs of caustic filtrate was obtained and 26.5 lbs. of purified salt was recovered.

Figure 5:
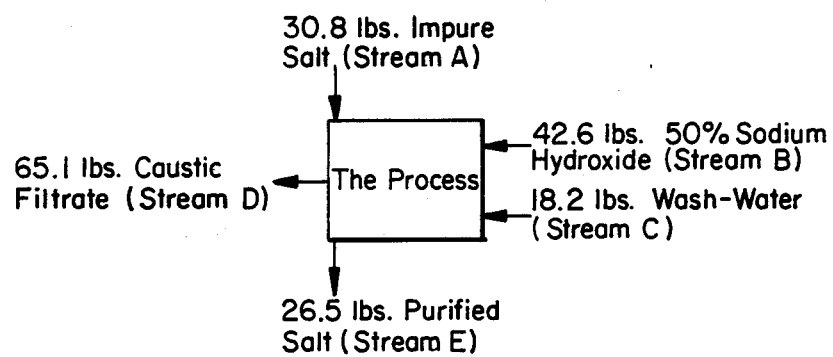
FIG. 5 is a flow sheet that illustrates the caustic-wash-water-wash salt purification operation of Example 7.

A simplified diagram of the process is shown in FIG. 5.

The input and output streams were analyzed for total organic carbon and total organic nitrogen to permit a material balance to be made on the purification process.

| Component | Input Stream - Impure Salt Total Lbs. contained in 30.8 lbs. Salt | Output Streams Carbon and Nitrogen Content D lbs. in 65.1 lbs | Output Streams Carbon and Nitrogen Content E lbs. in 26.5 lbs | Material Balance In (lbs) | Material Balance Out (lbs) | % Accountability |
|---|---|---|---|---|---|---|
| Organic Carbon | 0.0232 | 0.0217 | 0.0024 | .0232 | .0241 | 104 |

| Component | Input Stream - Impure Salt Total Lbs. contained in 30.8 lbs. Salt | Output Streams Carbon and Nitrogen Content | | Material Balance | | % Accountability |
|---|---|---|---|---|---|---|
| | | D lbs. in 65.1 lbs | E lbs. in 26.5 lbs. | In (lbs) | Out (lbs) | |
| Organic Nitrogen | 0.0172 | 0.0156 | 0.0017 | .0172 | .0173 | 101 |

The above data establish that the caustic and water washing procedure removed 88% of the organic carbon and 88% of the organic nitrogen from the impure salt.

Total organic carbon analyses were conducted using a Dohrmann Model DC-50 total carbon analyzer.

Total organic nitrogen analyses were conducted using a Dohrmann total nitrogen analyzer (reductive mode).

These instruments are well known to those skilled in the art of microorganic analyses.

Other modifications and variations of the present invention are possible in the light of the above teachings. It is, therefore, to be understood that changes may be made in the particular embodiments of the invention described which are within the full intended scope of the invention as defined by the appended claims.

What is claimed is:

1. A method of separating amines from the amine-sodium chloride mixture obtained as the by-product after neutralizing the product of the reaction of ethylene dichloride and ammonia with caustic soda, said method comprising:
   (a) first washing the amine-sodium chloride mixture with sufficient aqueous caustic soda to remove a portion of the amines and neutralize any residual amine hydrochloride salts and form a washed amine-sodium chloride mixture;
   (b) physically separating said separate washed amine-sodium chloride mixture from said portion of the amines by use of centrifugal force;
   (c) dissolving said separated washed amine-sodium chloride mixture in water; and
   (d) passing the dissolved amine-sodium chloride mixture through activated carbon to obtain a solution of sodium chloride substantially free of amines.

2. A method as defined in claim 1, wherein the aqueous caustic soda of step (a) is employed as a 15–50%, w/w solution at a weight ratio of caustic soda to amine-sodium chloride mixture of 0.1:1 to 2:1.

3. A method as defined in claim 2, wherein the dissolved amine-sodium chloride mixture is passed through activated carbon at a temperature between 10° and 50° C.

4. A method as defined in claim 3, wherein the activated carbon has been previously employed to obtain a solution of sodium chloride substantially free of amines and said activated carbon has been regenerated by washing with water sufficiently hot to remove absorbed amines.

* * * * *